US 8,209,600 B1

(12) United States Patent
Koh et al.

(10) Patent No.: US 8,209,600 B1
(45) Date of Patent: Jun. 26, 2012

(54) METHOD AND APPARATUS FOR GENERATING LAYOUT-PRESERVED TEXT

(75) Inventors: Eunyee Koh, San Jose, CA (US); Walter Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 396 days.

(21) Appl. No.: 12/471,814

(22) Filed: May 26, 2009

(51) Int. Cl.
*G06N 3/00* (2006.01)

(52) U.S. Cl. ..................................................... 715/244

(58) Field of Classification Search .................. 715/200, 715/205, 234, 239, 243, 244, 245, 246, 247, 715/248, 249, 250, 251, 252, 253, 254, 273
See application file for complete search history.

(56) References Cited

U.S. PATENT DOCUMENTS

| 7,752,538 | B2 * | 7/2010 | Vion-Dury | 715/228 |
|---|---|---|---|---|
| 2002/0149588 | A1 * | 10/2002 | Babcock | 345/468 |
| 2007/0009161 | A1 * | 1/2007 | Hollingsworth | 382/229 |
| 2007/0286485 | A1 * | 12/2007 | Berkner et al. | 382/176 |
| 2008/0027933 | A1 * | 1/2008 | Hussam | 707/6 |
| 2008/0028291 | A1 * | 1/2008 | Vion-Dury | 715/228 |
| 2010/0107061 | A1 * | 4/2010 | Ramakrishnan et al. | 715/256 |
| 2010/0275114 | A1 * | 10/2010 | Bastos dos Santos et al. | 715/228 |

OTHER PUBLICATIONS

U.S. Appl. No. 12/130,607 entitled "Extracting Reading Order Text and Semantic Entities" whose inventors are Walter Chang and Eunyee Koh.

Ha, J., Haralick, R.M., Phillips, I.T., "Recursive X-Y Cut using Bounding Boxes of Connected Components," Proceedings of third international conference on Document Analysis and Recognition (ICDAR 95) vol. 2, p. 952-955.

Liang, J., Ha, J., Haralick, R.M., Phillips, I.T., "Document Layout Structure Extraction Using Bounding Boxes of Different Entitles," Proceedings of the 3rd IEEE Workshop on Applications of Computer Vision (WACV '96), p. 278, Dec. 2-4, 1996.

Liang, J., Phillips, I.T., Haralick, R.M., "An Optimization Methodology for Document Structure Extraction on Latin Character Documents," IEEE Transactions on Pattern Analysis and Machine Intelligence, v.23 n.7, p. 719-734, Jul. 2001.

Meunier, Jean-Luc, "Optimized XY-Cut for Determining a Page Reading Order," Proceedings of the eighth international conference on Document Analysis and Recognition, 2005, pp. 347-351.

(Continued)

*Primary Examiner* — Kyle Stork

(74) *Attorney, Agent, or Firm* — Robert C. Kowert; Meyertons, Hood, Kivlin, Kowert & Goetzel, P.C.

(57) ABSTRACT

Methods and apparatus for generating layout-preserved text output from portable document format (PDF) input are described. A layout-preserved text generation method may generate layout-preserved text output from PDF input that includes the text along with indentations, spaces, newlines, and paging and that thus preserves the global document layout view of the original PDF input document. The layout-preserved text generation method may transform the PDF (X, Y) document space into a text file grid space while preserving a similar global view of the text and layout from the PDF (X, Y) document space. This transformation may include determining a base size per grid that may produce accurate layout in the text output from the PDF input.

25 Claims, 10 Drawing Sheets

OTHER PUBLICATIONS

Hassan, T. Baumgartner, R., "Intelligent Text Extraction from PDF Documents," Database & Artificial Intelligence Group, Vienna Univ. of Technol., Wien; Computational Intelligence for Modelling, Control and Automation, 2005 and International Conference on Intelligent Agents, Web Technologies and Internet Commerce, International Conference on ??? Publication Date: Nov. 28-30, 2005, vol. 2, on pp. 2-6. ISBN: 0-7695-2504-0.

Tamir Hassan, "PDF to HTML Conversion," CS310: Third Year Project 2002/3, University of Warwick, Coventry, West Midlands, UK.

* cited by examiner

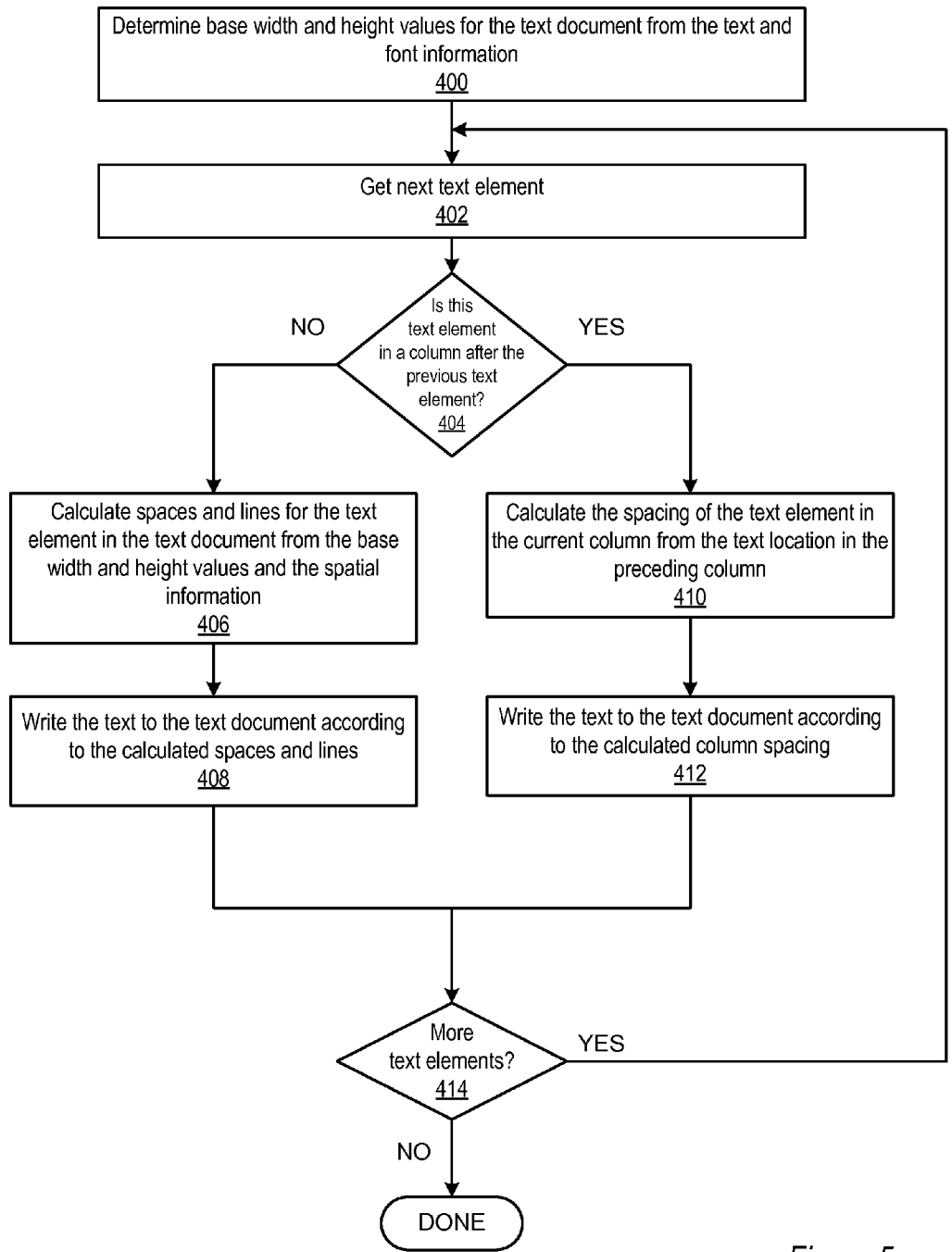

"TITLE"

Screenplay by

<Author's name>

FADE IN:

<Scene description – xxxxxxx xxxxxx xxxxxx xxxxxxx xxxxxx xxxxxxxxxx xxxx xxxxx xxxx xxxx xxxxxxxx xxxx xxxxxxxx>

TITLES BEGIN

<Scene description – xxxxxxx xxxxxx xxxxxx xxxxxxx xxxxxx xxxxxxxxxx xxxx xxxxx xxxx xxxx xxxxxxxx xxxx xxxxxxxx>

CHARACTER 1
   <Dialogue – xxxxxxx xxxxxx xxxxxx xxxxxxx xxxxxx xxxxxxxxxx
   xxxx xxxxx xxxx xxxx xxxxxxxx xxxx xxxxxxxx>

<Scene description – xxxxxxx xxxxxx xxxxxx xxxxxxx xxxxxx xxxxxxxxxx xxxx xxxxx xxxx xxxx xxxxxxxx xxxx xxxxxxxx>

CHARACTER 2
   <Dialogue – xxxxxxx xxxxxx xxxxxx xxxxxxx xxxxxx xxxxxxxxxx
   xxxx xxxxx xxxx xxxx xxxxxxxx xxxx xxxxxxxx>

<Scene description – xxxxxxx xxxxxx xxxxxx xxxxxxx xxxxxx xxxxxxxxxx xxxx xxxxx xxxx xxxx xxxxxxxx xxxx xxxxxxxx>

*Figure 8A*

"TITLE"

Screenplay by

<Author's name>

FADE IN:

<Scene description – xxxxxxx xxxxxx xxxxxx xxxxxxx xxxxxx xxxxxxxxxx xxxx xxxxx xxxx xxxx xxxxxxxx xxxx xxxxxxxx>

TITLES BEGIN

<Scene description – xxxxxxx xxxxxx xxxxxx xxxxxxx xxxxxx xxxxxxxxxx xxxx xxxxx xxxx xxxx xxxxxxxx xxxx xxxxxxxx>

CHARACTER 1
          <Dialogue – xxxxxxx xxxxxx xxxxxx xxxxxxx xxxxxx xxxxxxxxxx\xxxx xxxxx xxxx xxxx xxxxxxxx xxxx xxxxxxxx>

<Scene description – xxxxxxx xxxxxx xxxxxx xxxxxxx xxxxxx xxxxxxxxxx xxxx\xxxxx xxxx xxxx xxxxxxxx xxxx xxxxxxxx>

CHARACTER 2
          <Dialogue – xxxxxxx xxxxxx xxxxxx xxxxxxx xxxxxx xxxxxxxxxx xxxx xxxxx xxxx xxxx xxxxxxxx xxxx xxxxxxxx>

<Scene description – xxxxxxx xxxxxx xxxxxx xxxxxxx xxxxxx xxxxxxxxxx xxxx xxxxx xxxx xxxx xxxxxxxx xxxx xxxxxxxx>

*Figure 8B*

METHOD AND APPARATUS FOR GENERATING LAYOUT-PRESERVED TEXT

BACKGROUND

Description of the Related Art

Documents are generally formatted according to some layout pattern, whether the pattern is a simple block format or a more complex multi-column format. In many documents, metadata may be indicated by the document layout pattern. For example, the title of a document typically starts from the beginning of the document, and is typically presented in the center and top of the page. As another example, page number and publisher information is often presented in the center bottom of the page or in the top left or right corner of the page. The layout of a document may thus provide important key features that indicate useful metadata information of the document.

As an example of a document format that indicates metadata, movie scripts have a script layout format that is recognized as a film industry standard. The standard has evolved over decades in the industry, and has become a universal standard script format for writers in the film medium worldwide, from short dramas through feature-length films. Movie scripts have specific format requirements according to the evolved standard such as "There should be 2× returns between Scene Description and Dialogue (and vice versa)" and "Dialogue should be indented (tabbed but not centered) so that accurate script timings can be made." By using this standard, it is straightforward for a viewer, for example, to identify scene descriptions and dialogues from movie scripts.
Portable Document Format (PDF)

Adobe System's Portable Document Format (PDF) is a platform-independent format for representing documents, and has become a standard for electronic document storage and exchange. Text in PDF is represented by text elements in page content streams. A text element specifies that characters should be drawn at certain positions indicated by spatial coordinates. The characters are specified using the encoding of a selected font resource. Text in PDF documents may be considered similar to a drawing, with X and Y axes in the document, and X and Y coordinates for each of the text elements that indicate the locations of the elements in the document.

Many documents, for example movie scripts, are scanned or otherwise processed to generate PDF documents for storage and exchange. For example, a movie script may be converted to a PDF document, stored, and later retrieved. As another example, a movie script in PDF format may be downloaded or emailed. However, it is often necessary or desired to extract the text from a PDF document, such as a movie script preserved, downloaded, or emailed in PDF format. Conventional methods for extracting text from PDF documents, however, generally do not preserve formatting/page layout information. Therefore, for many documents, such as movie scripts, extracting text using these conventional methods may lose valuable metadata indicated by the formatting/page layout when extracting text from PDF documents.

Adobe and Adobe PDF are either registered trademarks or trademarks of Adobe Systems Incorporated in the United States and other countries.

SUMMARY

Various embodiments of methods and apparatus for generating layout-preserved text output from portable document format (PDF) input are described. Using embodiments of a layout-preserved text generation method as described herein, layout-preserved text output may be generated from PDF input that includes the text along with indentations, spaces, newlines, and paging and that thus preserves the global document layout view of the original PDF input document. Embodiments of the layout-preserved text generation method may transform the PDF (X, Y) document space into a text file grid space while preserving a similar global view of the text and layout from the PDF (X, Y) document space. This transformation may include determining a base size per grid that may produce accurate layout in the text output from the PDF input.

In some embodiments of a layout-preserved text generation method, a PDF document is obtained. Text, spatial information, font information, and possibly other information may be obtained from the PDF document. Base width and height values for the text document may be determined from the text and font information from the PDF document. The base width and height values may be designated as $(W_b, H_b)$. If the PDF document uses the same font style and size across the entire document, the average width and height values of this font may be determined and used as $(W_b, H_b)$. In some embodiments, the average width value of the font may be calculated as the average of the widths of all the characters of the particular font. The average height value may be similarly calculated, or determined using some other method. If the PDF document includes text elements in two or more different font styles and/or different font sizes, in some embodiments, the smallest font style/size may be selected and used to determine $(W_b, H_b)$ for the text document.

A next text element to be processed may be obtained. A space and line value $(S_N, L_N)$ may be calculated for the text element in the text document from the base width and height values $(W_b, H_b)$ and the spatial information corresponding to the text element. In some embodiments, to calculate $(S_N, L_N)$ for a text element N, the following formulas may be used:

$$S_N = X_N / W_b$$

$$L_N = Y_N / H_b$$

where $(X_N, Y_N)$ are the coordinates of the text element N in the (X, Y) space of the PDF document, $(W_b, H_b)$ are the base width and height being used for the transformation, and $(S_N, L_N)$ are the calculated spacing and newline values for the text element in the grid space of the layout-preserved text document. The text from the text element may be written to the output text document according to the space and line values $(S_N, L_N)$ corresponding to the text element to thus preserve the layout represented in the input PDF document. If there are more text elements to be processed, then the method gets and processes the next text element. If there are no more text elements to be processed, then the method is done.

A PDF document may include more than one page. In some embodiments, each page may be separately processed according to the above method. Text and spatial information, and possibly other information such as font information may be obtained for a page of the PDF document. $(W_b, H_b)$ may be determined for the page. The text elements on the page may then be processed accordingly. The method may then proceed to the next page.

Some PDF documents or some pages of a PDF document may include two or more columns of text elements. In some embodiments, if it is determined that a current text element is located in a column after a previously processed text element, the spacing $C_S$ of the current text element in this column from the text in the preceding column may be calculated as follows:

Get a value for I. In some embodiments, $(S_N, L_N)$ may be calculated for the current text element, and the calculated value for $S_N$ may be used as the value for I.

Get a value for J. In some embodiments, J may be calculated as the total number of character spaces on the current line up to and including the last character of the previously written text element.

Calculate $C_S$ as I–J.

The above calculations for column spacing may be expressed more generally as:

$$C_{Sn} = I_N - J_N$$

which may be more fully expressed as:

$$C_{Sn} = S_N - (S_{N-1} + \text{NumChars}(N-1))$$

where $C_{Sn}$ represents the column spacing being calculated for the current column, $S_N$ is the spacing calculated for the current text element according to the (X,Y) spatial information from the PDF document, $S_{N-1}$ is the spacing calculated for the previous text element according to the (X,Y) spatial information from the PDF document, and NumChars(N−1) represents the number of characters in the previous text element.

BRIEF DESCRIPTION OF THE DRAWINGS

FIG. 5 is a flowchart of a method for transforming text from a PDF document that may include columns according to spatial and font information of the PDF document to generate a layout-preserved text document, according to some embodiments.

FIGS. 8A and 8B show an example of generating a layout-preserved text document from an input PDF document according to some embodiments.

Figure 1:
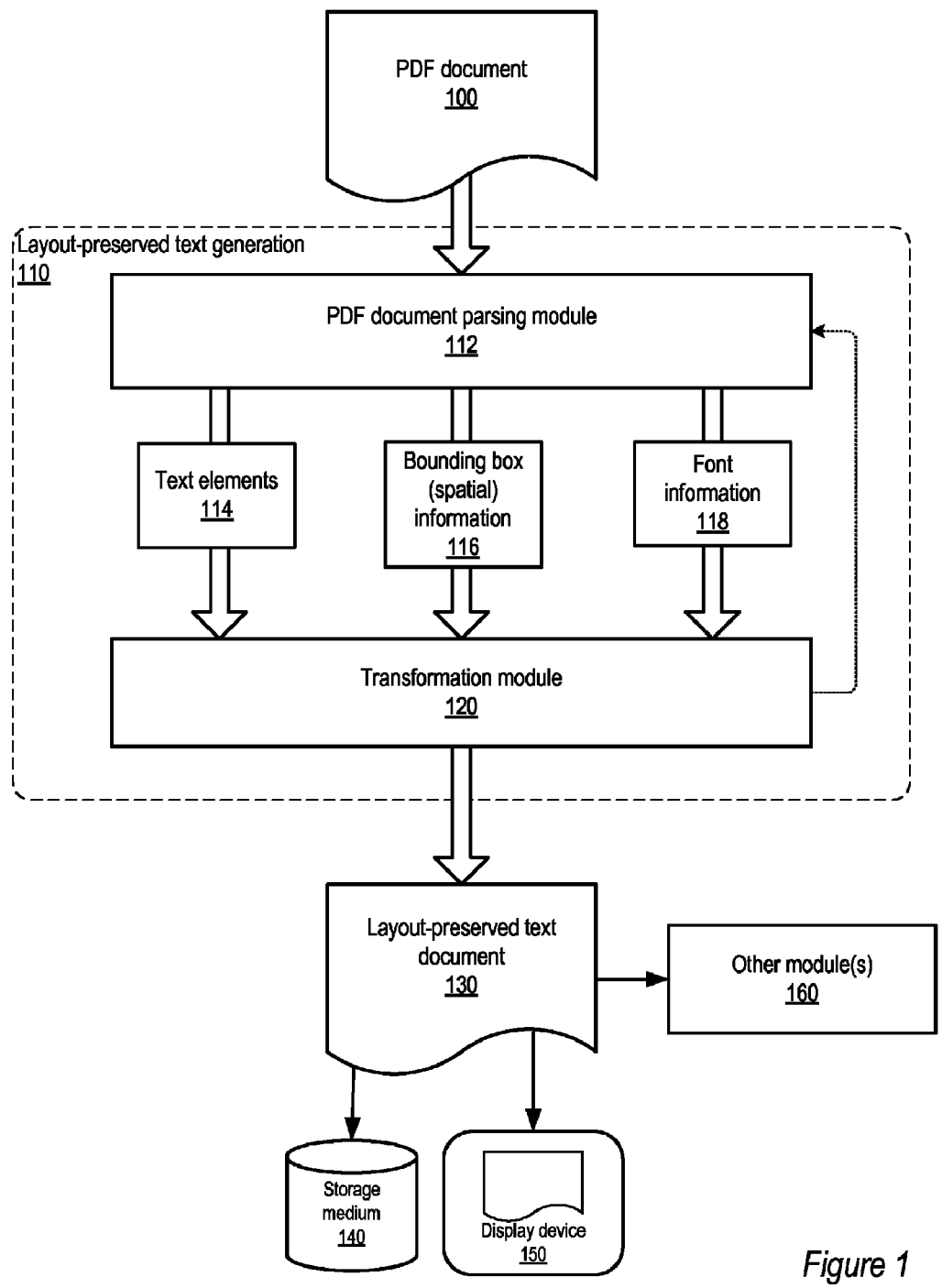
FIG. 1 is a block diagram that illustrates components of and dataflow in a layout-preserved text generation method according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for generating layout-preserved text output from portable document format (PDF) input are described. PDF documents are formatted according to a document format that specifies locations of elements within the source document in (X,Y) spatial coordinates. The output text documents are formatted according to a grid space in which text is located horizontally on lines according to character spacing and vertically according to line spacing. Using embodiments of a layout-preserved text generation method as described herein, layout-preserved text output may be generated from PDF input; the text output includes the text from the PDF document along with indentations, spaces, newlines, and paging that preserve the global document layout view of the original PDF input. Embodiments of the layout-preserved text generation method provide text extraction from PDF documents that preserves or closely approximates the layout of text in the original PDF document. Embodiments of the layout-preserved text generation method may transform the PDF (X, Y) document space into the text file grid space while preserving a similar global view of the text and layout from the PDF (X, Y) document space. This transformation may include determining a base width and height size per grid that may produce accurate layout in the text output from the PDF input. Embodiments may produce more accurate layout preserved text when compared to output produced by conventional text extraction methods.

Embodiments of the layout-preserved text generation method as described herein may, for example, be applied to augment methods for reading-order text extraction such as described in U.S. patent application Ser. No. 12/130,607 entitled "EXTRACTING READING ORDER TEXT AND SEMANTIC ENTITIES" whose inventors are Walter Chang and Eunyee Koh, the content of which is incorporated by reference herein in its entirety.

While embodiments are described as being applied to the extraction of text from PDF documents, embodiments may be adapted for use with other document formats including other document formats that store text in a similar manner to PDF. In addition, while embodiments are described as being applied to the extraction of text from documents, embodiments may be adapted for use in extracting other document elements than text.

Figure 10:
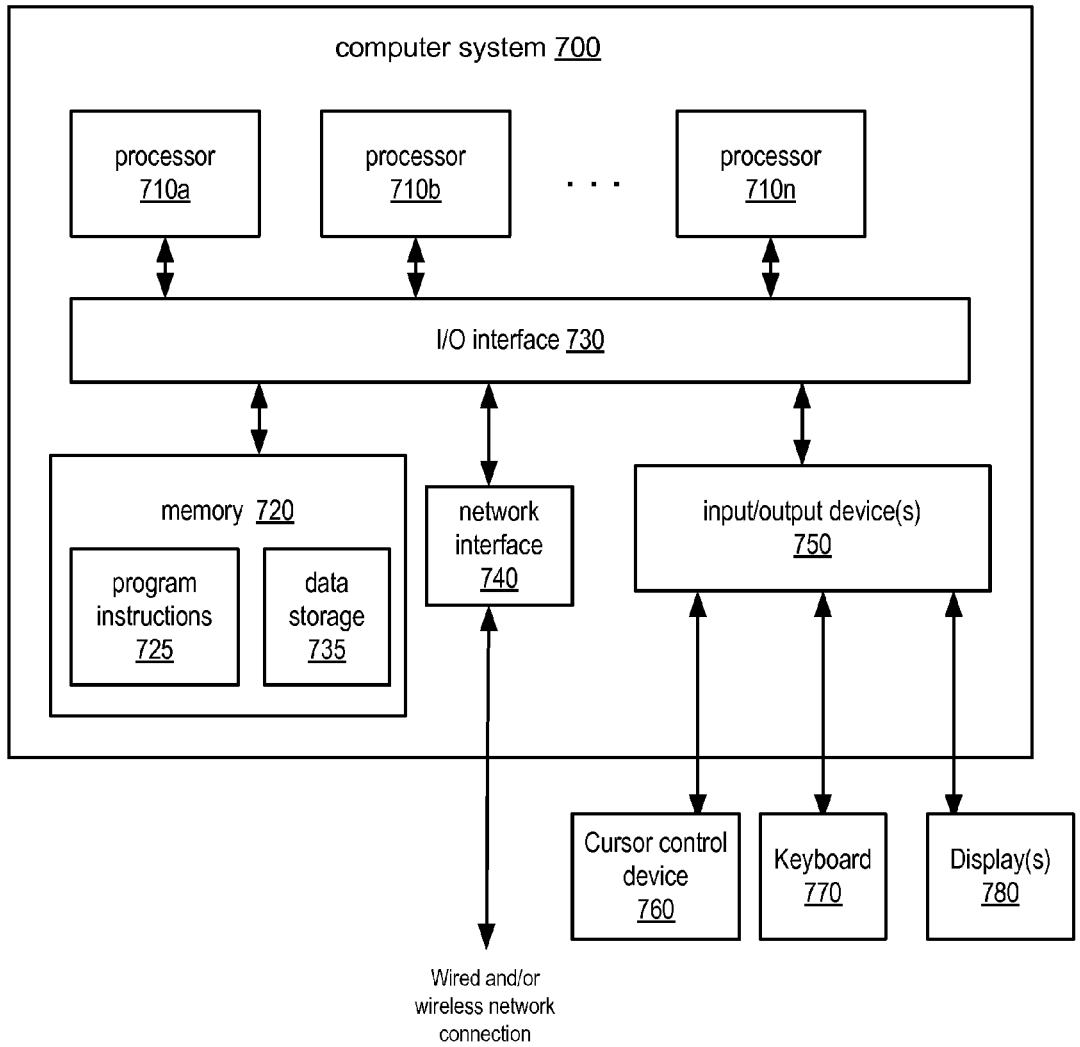
FIG. 10 illustrates an example computer system that may be used in embodiments.

Some embodiments may include a means for obtaining text and other information from a PDF document and a means for transforming the text into a layout-preserved text document. For example, a toolkit, application, or library may include a PDF document parsing module for parsing PDF documents to obtain text and other information from the PDF documents and a transformation module for transforming the text into a layout-preserved text document. Alternatively, some embodiments may provide a single module that performs both the PDF document parsing and the transformation. The module(s) may in some embodiments be implemented by a computer-readable storage medium and one or more processors (e.g., CPUs) of a computing apparatus. An example computer system in which embodiments of the module(s) may be implemented is illustrated in FIG. 10. The computer-readable storage medium may store program instructions executable by the one or more processors to cause the computing apparatus to perform PDF document parsing to obtain text and other information from a PDF document and transformation of the text to generate a layout-preserved text document. Other embodiments of the module(s) may be at least partially implemented by hardware circuitry and/or firmware stored, for example, in a non-volatile memory. Embodiments of the PDF document parsing module, embodiments of a transformation module, or embodiments of a single module that performs both PDF document parsing and transformation, may be implemented, for example, as stand-alone applications, modules in other applications, modules in libraries, modules in toolkits, and so on.

FIG. 1 is a block diagram that illustrates components of and dataflow in a layout-preserved text generation method according to some embodiments. A PDF document 100 is input to an implementation of the layout-preserved text generation method 110. In some embodiments, the layout-preserved text generation method 110 may be implemented as or by a PDF document parsing module 112 and a transformation module 120. The PDF document parsing module 112 extracts or reads information from the PDF document and provides the information to the transformation module 120. This information may include, but is not limited to, one or more text elements 114, and bounding box, or spatial, information 116 for the text elements. In some embodiments, font information 118 for the text elements may also be read or extracted. A text element 114 may be a single character, a string of characters, a word, a phrase, a sentence, or in general any string of one or more characters. Generally, however, a text element 114 may be the content of one line or portion of one line in the PDF document 100. The characters in a text element 114 may include any displayable character, including alphanumeric characters, symbols, punctuation marks, and spaces. See, for example, FIG. 4A, in which "Example text 1," "Example text 2," and "Example text 3" are shown as three illustrative text elements 114 in PDF document 100. While examples provided herein show English words using the conventional English alphabet/character set, embodiments may be applied to documents including other alphabets, writing systems, or symbol sets, such as Hebrew, Arabic, Greek, Cyrillic, Kanji, Chinese, mathematical expressions, and so on.

Spatial information 116 indicates the PDF document (X,Y) spatial information for corresponding text elements 114. See, for example, FIG. 4A, in which $(X_1,Y_1)$, $(X_2,Y_2)$, and $(X_3,Y_3)$ are the spatial coordinates of the top, left corner of bounding boxes for corresponding text elements "Example text 1," "Example text 2," and "Example text 3" in the (X,Y) space of PDF document 100.

Font information 118 may include font style, font size, and other font information for corresponding text elements 114. While FIG. 4A does not explicitly show font information 118 for the text elements 114, note that "Example text 1," "Example text 2," and "Example text 3" are each shown in a different font size or font style: "Example text 1" is shown in Arial font, size 12; "Example text 2" is shown in Arial font, size 14; and "Example text 3" is shown in Times New Roman font, size 18.

Transformation module 120 receives the text elements 114, spatial, information 116, and possibly font information 118 from PDF document parsing module 112 and applies a text transformation method as described herein to generate a layout-preserved text document 130 from the text according to the spatial and font information. In some embodiments, rather than receiving font information 118 from PDF document parsing module 112, the transformation module may instead read the font information directly from the PDF document 100. Text document 130 may, for example, be stored to a local or network storage medium 140, such as system memory, a local or network disk drive or other storage system, DVD, CD, etc. Instead, or in addition, text document 130 may be displayed to a display device 150, or provided to one or more other modules 160 for additional processing.

Figure 2:
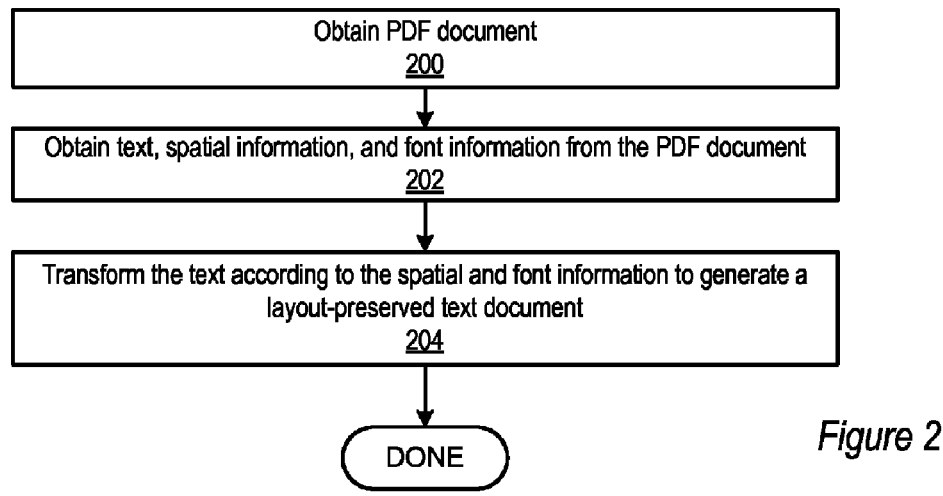
FIG. 2 is a high-level flowchart of a layout-preserved text generation method according to some embodiments.

FIG. 2 is a high-level flowchart of a layout-preserved text generation method according to some embodiments. As indicated at 200, a PDF document is obtained. As indicated at 202, text and spatial information, and possibly other information such as font information may be obtained from the PDF document. As indicated at 204, the extracted text is transformed according to the spatial and font information to generate a layout-preserved text document.

A PDF document may include more than one page. In some embodiments, elements 202 and 204 of FIG. 2 may be performed for each page in an input PDF document.

Figure 3:
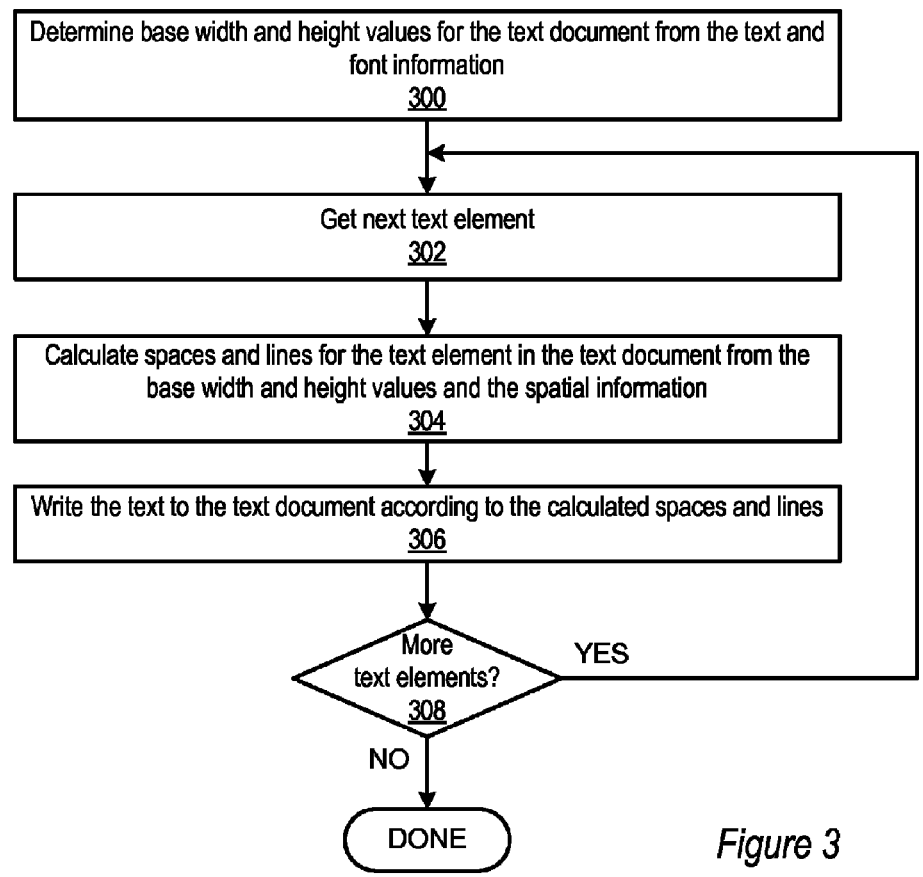
FIG. 3 is a flowchart of a method for transforming text from a PDF document according to spatial and font information of the PDF document to generate a layout-preserved text document, according to some embodiments.

FIG. 3 is a flowchart of a method for transforming text from a PDF document according to spatial and font information of the PDF document to generate a layout-preserved text document, according to some embodiments. FIG. 3 expands on element 204 of FIG. 2, and represents a method that may be implemented by embodiments of a transformation module 120 as illustrated in FIG. 1.

As indicated at 300, base width and height values for the text document may be determined from the text and font information. For the purpose of this document, the base width and height values may be designated as $(W_b, H_b)$. If the PDF document uses the same font style and size across the entire document, the average width and height values of this font may be determined and used as $(W_b, H_b)$. In some embodiments, the average width value of the font may be calculated as the average of the widths of all the characters (a-z, A-Z, etc.) in the character set of the particular font. The average height value may be similarly calculated, or determined using some other method. In various embodiments, other methods for obtaining the average width and height values may be used, and other values than the average width and height of the font may be used for $(W_b, H_b)$.

If the PDF document includes text elements in two or more different font styles and/or different font sizes, in some embodiments, the smallest font style/size may be selected and used to determine $(W_b, H_b)$ for the text document. As an example, in FIG. 4A, "Example text 1" is shown in Arial font, size 12; "Example text 2" is shown in Arial font, size 14; and "Example text 3" is shown in Times New Roman font, size 18. Thus, in this example, the font used for "Example text 1" may be used to determine $(W_b, H_b)$.

A PDF document may include more than one page. In some embodiments, $(W_b, H_b)$ may be determined separately for each page. In these embodiments, the method may find the font styles and sizes used on a current page and select the smallest font style and size that has been used on the page. The smallest font style/size may then be used in determining $(W_b, H_b)$ for the page. Other methods may be used to determine $(W_b, H_b)$ for documents or pages of documents in some embodiments.

As indicated at 302, a next text element to be processed may be obtained. A text element may be a single character, a string of characters, a word, a phrase, a sentence, or in general any string of one or more characters. Generally, however, a text element may be the content of one line or portion of one line in the PDF document. The characters in a text element may include any displayable character, including alphanumeric characters, symbols, punctuation marks, and spaces. See, for example, FIG. 4A, in which "Example text 1," "Example text 2," and "Example text 3" are shown as three illustrative text elements 114 in PDF document 100.

As indicated at 304, a space and line value $(S_N, L_N)$ may be calculated for the text element in the text document from the base width and height values $(W_b, H_b)$ and the spatial information corresponding to the text element. In some embodiments, to calculate $(S_N, L_N)$ for a text element N, the following formulas may be used:

$$S_N = X_N/W_b$$

$$L_N = Y_N/H_b$$

where $(X_N, Y_N)$ are the coordinates of the text element N in the (X, Y) space of the PDF document, $(W_b, H_b)$ are the base width and height being used for the transformation, and $(S_N, L_N)$ are the calculated spacing and newline values for the text element in the grid space of the layout-preserved text document.

As indicated at 306, the text from the text element may be written to the output text document according to the space and line values $(S_N, L_N)$ corresponding to the text element to thus preserve the layout represented in the input PDF document. See FIGS. 4A through 4D for an example of writing text elements to a layout-preserved text document.

At 308, the method determines if there are more text elements to be processed. If there are more text elements to be processed, then the method returns to 302 to begin processing the next text element. If there are no more text elements to be processed, then the method is done. Note that, in some embodiments, elements 300 through 308 may be performed for each page in the PDF document if the PDF document is a multi-page document. Thus, in these embodiments, if there are more pages to be processed, then the method returns to element 300 to begin processing the next page.

In some embodiments, the text content of all of the text elements may be written to the text document in the font type and size that corresponds to $(W_b, H_b)$. In other words, the font type and size used to calculate $(W_b, H_b)$ may be used to write all the text to the text document, or to the current page of the text document if the PDF document includes multiple pages and the pages are being processed separately. Thus, in these embodiments, while the page layout is preserved, font characteristics may not be preserved for at least some text elements.

Figure 4A:
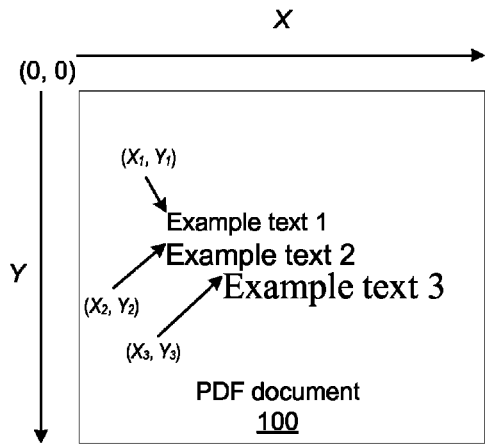
FIGS. 4A through 4D illustrate determining spaces and lines for example text elements in an example PDF document from calculated base width and height values and the spatial information corresponding to the text elements, according to some embodiments.

FIGS. 4A through 4D illustrate determining spaces and lines for example text elements in an example PDF document from the calculated $(W_b, H_b)$ values and the spatial information corresponding to the text elements, according to some embodiments. FIG. 4A shows an example input PDF document 100. In FIG. 4A, "Example text 1," "Example text 2," and "Example text 3" are shown as three illustrative text elements in PDF document 100. $(X_1, Y_1)$, $(X_2, Y_2)$, and $(X_3, Y_3)$ are the spatial coordinates of the top, left corner of bounding boxes for the corresponding text elements "Example text 1," "Example text 2," and "Example text 3" in the (X,Y) space of PDF document 100. These (X, Y) values may be obtained from the PDF document, or alternatively may be determined from other spatial information, such as bounding box coordinates, obtained from the PDF document.

Figure 4B:
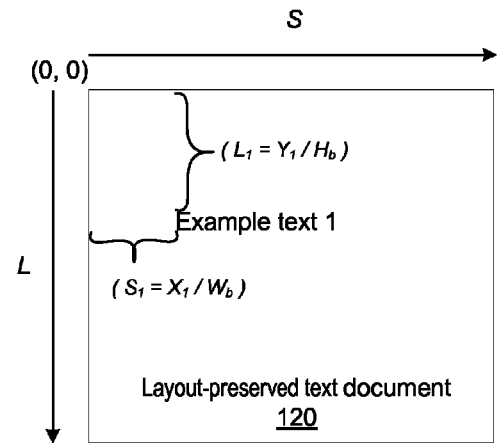
Figure 4C:
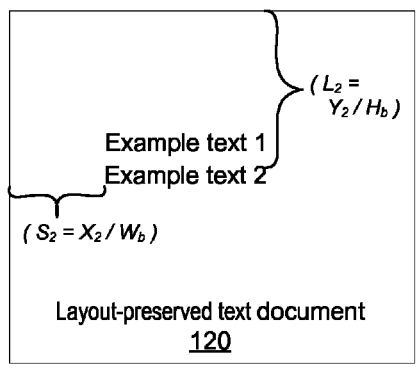
Figure 4D:
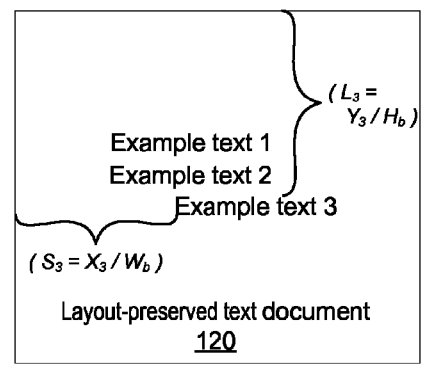

FIGS. 4B through 4D show an example layout-preserved text document 120 being generated according to the text transformation method from the example PDF input document 100 of FIG. 4A, and illustrate a method that may be used in some embodiments to calculate the space and line values $(S_N, L_N)$ for each text element to be written to the text document 120. In some embodiments, the text elements obtained from the PDF document 100 may be processed and written to the layout-preserved text document 120 sequentially according to respective spatial information obtained from the PDF document, from the top or beginning of the PDF document 100 downward, and from the left of the PDF document 100 to the right. FIGS. 4B through 4D show the sequential processing and writing of the text elements from the top of the document. Other embodiments may process the text elements according to other orders or methods.

In some embodiments, to calculate $(S_N, L_N)$ for a text element N, the following formulas may be used:

$$S_N = X_N/W_b$$

$$L_N = Y_N/H_b$$

where $(X_N, Y_N)$ are the coordinates of the text element N in the (X, Y) space of PDF document 100, $(W_b, H_b)$ are the base width and height being used for the transformation, and $(S_N, L_N)$ are the calculated spacing and newline values for the text element in the grid space of the layout-preserved text document 120.

In FIG. 4B, ($S_1$, $L_1$) are calculated for the text element "Example text 1" as:

$$S_1 = X_1/W_b$$

$$L_1 = Y_1/H_b$$

"Example text 1" is then written to the text document 120 at location ($S_1$, $L_1$). In FIG. 4C, ($S_2$, $L_2$) are calculated for the text element "Example text 2" as:

$$S_2 = X_2/W_b$$

$$L_2 = Y_2/H_b$$

"Example text 2" is then written to the text document 120 at location ($S_2$, $L_2$). In FIG. 4D, ($S_3$, $L_3$) are calculated for the text element "Example text 3" as:

$$S_3 = X_3/W_b$$

$$L_3 = Y_3/H_b$$

"Example text 3" is then written to the text document 120 at location ($S_3$, $L_3$).

In some embodiments, the text content of all of the text elements is written to the text document in the font type and size that corresponds to ($W_b$, $H_b$). In other words, the font type and size used to calculate ($W_b$, $H_b$) is used to write all the text to the text document 120. Thus, in these embodiments, while the page layout is preserved, font characteristics may not be preserved for at least some text elements.

Processing Columnar Data

Some PDF documents may include two or more columns that include text elements. See, for example, FIGS. 6A and 8A. In some embodiments, columnar text may be processed by the method illustrated in FIG. 3 to determine the location in the text document at which the columnar text is to be written. However, in practice, calculating the spacing for the columns according to the method of FIG. 3 may not properly space the columns; for example, successive columns may be slightly misaligned. Therefore, in some embodiments, a different calculation may be used to determine the spacing between columns of text.

FIG. 5 is a flowchart of a method for transforming text from a PDF document that may include columns according to spatial and font information of the PDF document to generate a layout-preserved text document, according to some embodiments.

FIG. 5 expands on element 204 of FIG. 2, and represents a method that may be implemented by embodiments of a transformation module 120 as illustrated in FIG. 1. FIG. 5 differs from FIG. 3 in that columnar data are detected and the spacing between columns (referred to as $C_S$) is calculated differently than the calculation for $S_N$, and $C_S$ is used to horizontally position columnar text elements in the layout-preserved text document instead of $S_N$. Note that $S_N$ may be used to horizontally position the text elements in the first column, and $C_S$, calculated separately for each text element may be used in horizontally positioning text elements in subsequent columns. Further, $L_N$ may be calculated for each text element as in FIG. 3 and used to position the respective text elements vertically.

As indicated at 400, base width and height values for the text document may be determined from the text and font information. For the purpose of this document, the base width and height values may be designated as ($W_b$, $H_b$). If the PDF document uses the same font style and size across the entire document, the average width and height value of this font may be determined and used as ($W_b$, $H_b$). In some embodiments, the average width value of the font may be calculated as the average of the widths of all the characters (a-z, A-Z, etc.) in the character set of the particular font. The average height value may be similarly calculated, or determined using some other method. In various embodiments, other methods for obtaining the average width and height values may be used, and other values than the average width and height of the fond may be used for ($W_b$, $H_b$). If the PDF document includes text elements in two or more different font styles and/or different font sizes, in some embodiments, the smallest font style/size may be selected and used to determine ($W_b$, $H_b$) for the text document. In some embodiments, ($W_b$, $H_b$) may be determined separately for each page of a multi-page document.

As indicated at 402, a next text element to be processed may be obtained. See, for example, FIG. 6A, in which "Example text 4" and "Example text 5" are shown as illustrative text elements in PDF document 100.

As indicated at 404, a check may be made to determine if the current text element is located in a column after the previously processed text element. Various methods may be used to determine if a text element is in a column after a previously processed text element. For example, in some embodiments, the (X, Y) spatial information for the text elements may be compared. If the Y values for the text elements are the same or within a specified threshold, then this may indicate that the text elements are (or begin) at the same or approximately the same vertical position, and thus it may be determined that the current text element is to be processed as columnar data.

Figure 6A:
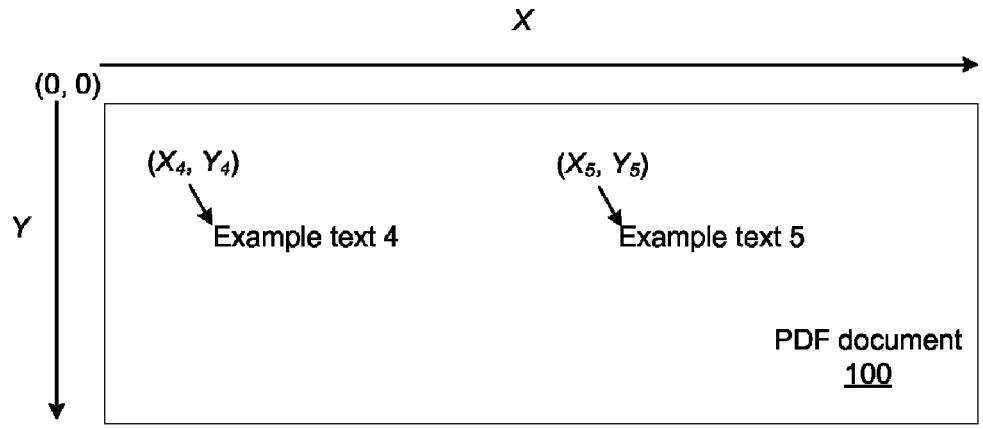
FIGS. 6A through 6C illustrate determining spacing in a layout-preserved text document for columns of text in an example PDF document according to some embodiments.
Figure 6B:
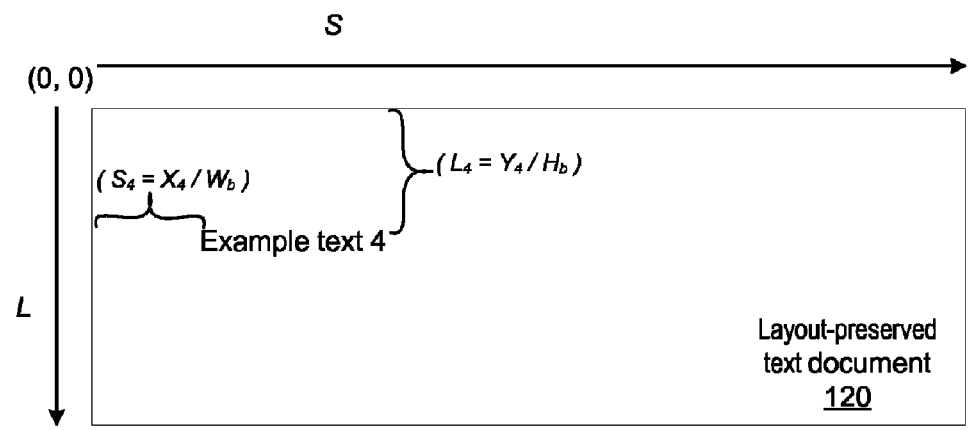

At 404, if it is determined that the text element is not located in a column after the previously processed text element, then the text element may be processed as indicated at 406 and 408 of FIG. 5. For example, as shown in FIGS. 6A and 6B, "Example text 4" is not located in a column after previously processed data, and thus may be processed as follows. As indicated at 406, a space and line value ($S_N$, $L_N$) may be calculated for the text element in the text document from the base width and height values ($W_b$, $H_b$) and the spatial information corresponding to the text element. In some embodiments, to calculate ($S_N$, $L_N$) for a text element N, the following formulas may be used:

$$S_N = X_N/W_b$$

$$L_N = Y_N/H_b$$

where ($X_N$, $Y_N$) are the coordinates of the text element N in the (X, Y) space of the PDF document, ($W_b$, $H_b$) are the base width and height being used for the transformation, and ($S_N$, $L_N$) are the calculated spacing and newline values for the text element in the grid space of the layout-preserved text document.

As indicated at 408, the text from the text element may be written to the output text document according to the space and line values ($S_N$, $L_N$) corresponding to the text element to thus preserve the layout represented in the input PDF document. See FIGS. 6A and 6B for an example of writing a text element to a layout-preserved text document according to 406 and 408.

Figure 6C:
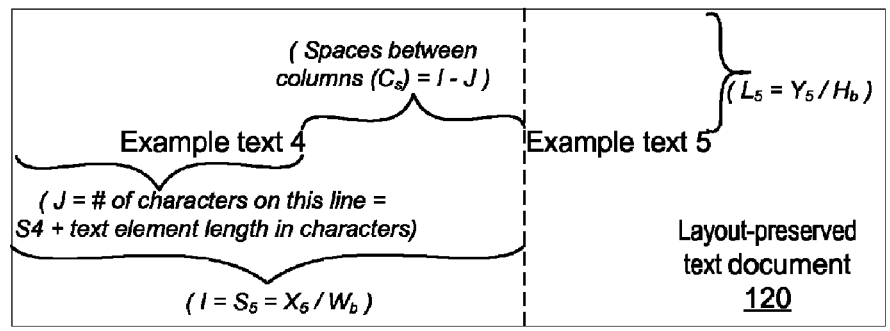

At 404, if it is determined that the text element is located in a column after the previously processed text element, then the text element may be processed as indicated at 410 and 412 of FIG. 5. For example, as shown in FIGS. 6A through 6C, "Example text 5" is located in a column after previously processed data ("Example text 4"), and thus may be processed as follows.

As indicated at 410, the spacing of the current text element in this column from the text in the preceding column may be calculated. This spacing may be designated as $C_S$. In some embodiments, the calculation to find a value for ($C_S$) for the current text element may be performed as follows. Refer to FIG. 6C for an illustrative example:

Get a value for I. In some embodiments, to calculate I, ($S_N$, $L_N$) may be calculated for the current text element, for example as described above in reference to element 406. Thus, the calculated value for $S_N$ ($X_N/W_b$) may be used as the value for I.

Get a value for J. In some embodiments, J may be calculated as the total number of character spaces used so far on this line, or as the total number of character spaces on the current line up to and including the last character of the previously written text element. For example, referring to FIGS. 6B and 6C, J is calculated as $S_4$ (calculated for the text element "Example text 4") plus the number of characters in the text element "Example text 4" (14).

Calculate $C_S$. In some embodiments, $C_S$=I−J.

As indicated at 412, the text from the current text element may be written to the output text document according to the calculated column spacing $C_{Sn}$ and the $L_N$ value calculated for this text element to thus preserve the layout represented in the input PDF document. In some embodiments, the current text element may be written to the text document at $C_{Sn}$ spaces from the end of the previously written text element on this line, with the vertical spacing (newlines) determined by $L_N$. See FIGS. 6A, 6C, 7A, and 7B for examples of writing columnar text elements from a PDF document to a layout-preserved text document according to 410 and 412 of FIG. 5.

At 414 of FIG. 5, the method determines if there are more text elements to be processed. If there are more text elements to be processed, then the method returns to 402 to begin processing the next text element. If there are no more text elements to be processed, then the method is done. Note that, in some embodiments, elements 400 through 412 may be performed for each page in the PDF document if the PDF document is a multi-page document. Thus, in these embodiments, if there are more pages to be processed, then the method returns to element 400 to begin processing the next page.

FIGS. 6A through 6C illustrate determining spacing for columns of text in an example PDF document according to some embodiments. FIG. 6A shows an example input PDF document 100. In FIG. 6A, "Example text 4" and "Example text 5" are shown as illustrative text elements formatted in two columns in PDF document 100. ($X_4$,$Y_4$), and ($X_5$,$Y_5$) are the spatial coordinates of the top, left corner of bounding boxes for the corresponding text elements in the (X,Y) space of PDF document 100. These (X,Y) values may be obtained from the PDF document, or alternatively may be determined from other spatial information obtained from the PDF document.

FIGS. 6B and 6C show an example layout-preserved text document 120 being generated according to the text transformation method from the example PDF input document 100 of FIG. 6A, and illustrate a method that may be used in some embodiments to calculate the horizontal and vertical location for each text element to be written to the text document 120. In some embodiments, the text elements from the PDF document 100 may be processed and written to the layout-preserved text document 120 sequentially according to respective spatial information from the PDF document, from the top or beginning of the PDF document 100 downward, and from the left of the PDF document 100 to the right. FIGS. 6B and 6C show the sequential processing and writing of the text elements from the top of the document. Other embodiments may process the text elements according to other orders or methods.

FIG. 6B illustrates the calculations for determining a location for writing the first text element on a line, "Example text 4", which is in a first column of the line to be processed. In some embodiments, when processing the text elements, a determination may be made as to whether a current text element is in a column after a previous text element on the line. "Example text 4" appears in the first column, and so there is no previous text element in a previous column on the line. Therefore, the location for "Example text 4" may be determined as follows:

$$S_4 = X_4/W_b$$

$$L_4 = Y_4/H_b$$

where ($X_4$, $Y_4$) are the coordinates of the text element "Example text 4" in the (X,Y) space of PDF document 100, ($W_b$, $H_b$) are the base width and height being used for the transformation, and ($S_4$, $L_4$) are the calculated spacing and newline values for the text element "Example text 4" in the grid space of the layout-preserved text document 120.

FIG. 6C illustrates the calculations for determining a location for writing a text element that appears in a column after a text element in a previous column. The text element "Example text 5" is in a second column of the line to be processed. Instead of calculating the location as indicated above for the text element "Example text 4", the spacing of "Example text 5" in this column from "Example text 4" in the first column ($C_S$) may be calculated. In some embodiments, this calculation may be performed as follows:

Get a value for I. In some embodiments, to calculate I, ($S_5$, $L_5$) may be calculated for "Example text 5". The calculated value for $S_5$ may be used as the value for I.

Get a value for J. In some embodiments, J may be calculated as the total number of character spaces used so far on this line, or as the total number of character spaces on the current line up to and including the last character of the previously written text element. For example, J may be calculated as $S_4$ (calculated for the text element "Example text 4") plus the number of characters in the text element "Example text 4".

Calculate $C_S$. In some embodiments, $C_S$=I−J.

Figure 7A:
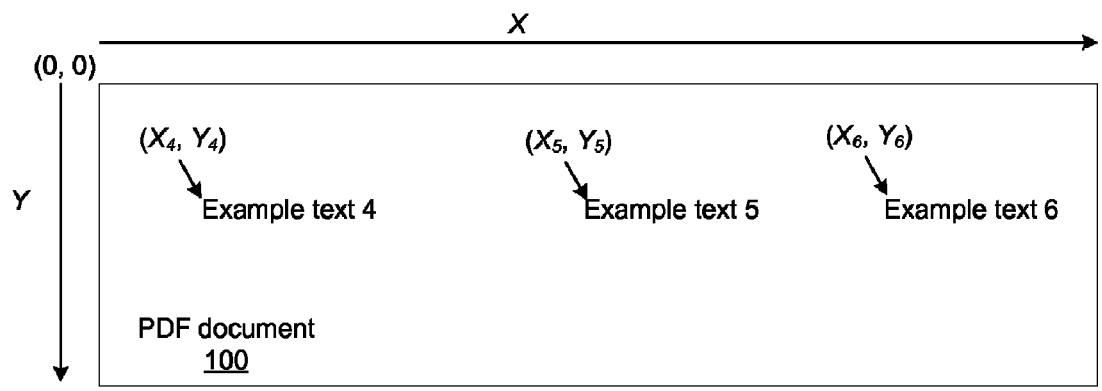
FIGS. 7A and 7B illustrate determining spacing in a layout-preserved text document for multiple columns of text in an example PDF document according to some embodiments.
Figure 7B:
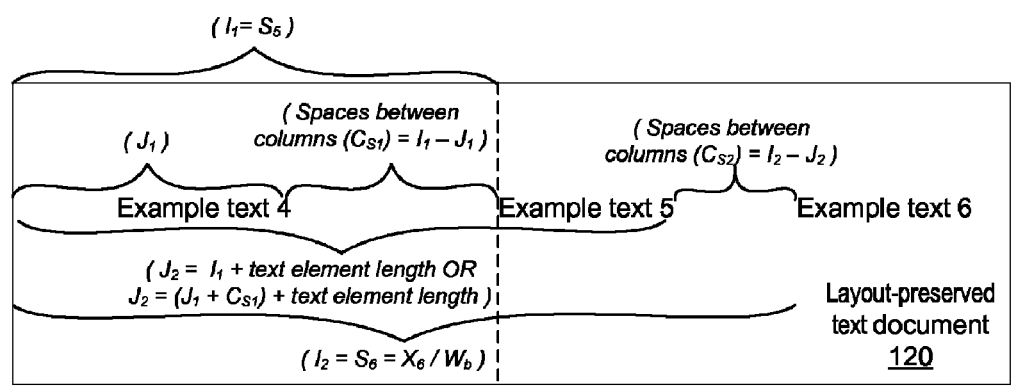

There may be more than two columns in a document. A similar calculation may be performed for additional columns to find the column spacing $C_{Sn}$ between columns. FIGS. 7A and 7B illustrate determining spacing for multiple columns of text in an example PDF document according to some embodiments. FIG. 7A shows an example input PDF document 100 that includes three columns. In FIG. 7A, "Example text 4", "Example text 5", and "Example text 6" are shown as example text elements formatted in columns in PDF document 100. ($X_4$,$Y_4$), ($X_5$,$Y_5$), and ($X_6$,$Y_6$) are the spatial coordinates of the top, left corner of bounding boxes for the corresponding text elements in the (X,Y) space of PDF document 100. Spacing of the first two columns in FIGS. 7A-7B may be calculated as shown in FIGS. 6A through 6C. The calculated spacing between the first two columns is represented as $C_{S1}$ in FIG. 7B, and I and J used in calculating $C_{S1}$ are represented as $I_1$ and $J_1$. The spacing between the second and third columns ($C_{S2}$) may be calculated as follows:

Get a value for $I_2$. In some embodiments, to calculate $I_2$, ($S_6$, $L_6$) may be calculated for the current text element ("Example text 6"), and the value for $S_6$ may be used as the value for $I_2$.

Get a value for $J_2$. In some embodiments, $J_2$ may be calculated as the total number of character spaces used so far on this line, or as the total number of character spaces on the current line up to and including the last character of the previously written text element. Referring to FIG. 7B, $J_2$ may be calculated as $I_1$ ($S_5$) plus the number of characters in the text element "Example text 5". Alternatively, $J_2$ may be calculated as $(J_1+C_{S1})$ plus the number of characters in the text element "Example text 5". Calculate $C_{S2}$ as $(I_2-J_2)$.

The above calculations for column spacing may be expressed more generally as:

$$C_{Sn}=I_N-J_N$$

which may be more fully expressed as:

$$C_{Sn}=S_N-(S_{N-1}+\text{NumChars}(N-1))$$

where $C_{Sn}$ represents the column spacing being calculated for the current column, $S_N$ is the spacing calculated for the current text element according to the (X,Y) spatial information from the PDF document, $S_{N-1}$ is the spacing calculated for the previous text element according to the (X,Y) spatial information from the PDF document, and NumChars(N-1) represents the number of characters in the previous text element. Again, as an alternative, $(J_{N-1}+C_{S(n-1)})$ may be used in the calculation instead of $S_{N-1}$.

FIGS. 8A and 8B show an example of generating a layout-preserved text document from an input PDF document according to some embodiments. FIG. 8A shows an example first page of a script formatted according to a conventional "movie script" standard layout as the page appears in a PDF document. An implementation of an embodiment of a layout-preserved text generation method as described herein, for example implemented as illustrated in FIG. 1, may be used to generate a layout-preserved text document from the input PDF document of FIG. 8A. FIG. 8B shows an example output first page of the layout-preserved text document generated from the input PDF document of FIG. 8A by an implementation of an embodiment of the layout-preserved text generation method. Note that the layout/formatting of the page is preserved, thus preserving metadata indicated by the "movie script" standard layout.

Figure 9A:
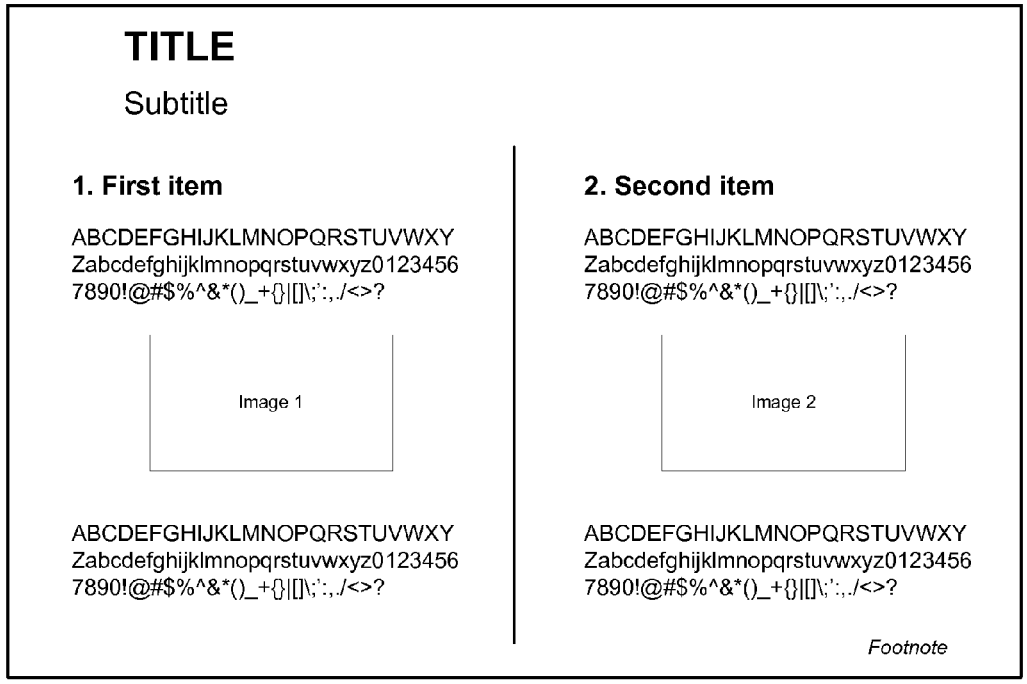
FIGS. 9A and 9B show an example of generating a layout-preserved text document from an input PDF document that includes columnar data, according to some embodiments.
Figure 9B:

FIGS. 9A and 9B show an example of generating a layout-preserved text document from an input PDF document that includes columnar data, according to some embodiments. FIG. 9A shows a page of an example PDF document that includes two columns. Note that, in the PDF document, the columns include both text and images, and that other elements (e.g., a vertical line separating the columns) are included on the page. Further note that different types of text elements, e.g. a Title, Subtitle, Footnote, column headings, and column content, are included on the page. Further note that different font styles and/or sizes are used for different text elements.

An implementation of an embodiment of a layout-preserved text generation method as described herein, for example implemented as illustrated in FIG. 1, may be used to generate a layout-preserved text document from the input PDF document of FIG. 9A. FIG. 9B shows an example output layout-preserved text document generated from the input PDF document of FIG. 9A by an implementation of an embodiment of the layout-preserved text generation method.

The PDF document of FIG. 9A includes text elements in different font styles and sizes. In some embodiments, the smallest font style/size is determined and used to determine the ($W_b$, $H_b$) values to be used in generating the text document. As an example, in FIG. 9A, "Footnote" is in Arial font, size 9, which is determined as the smallest font size, and ($W_b$, $H_b$) is determined from Arial font, size 9. In FIG. 9B, the font used for the text written to the text document is Arial font, size 9.

In some embodiments, only text elements are processed from the input PDF document and written to the layout-preserved text document by the layout-preserved text generation method. Thus, images and other non-text content that appear in the example PDF document of FIG. 9A are absent from the output layout-preserved text document of FIG. 9B. Note, however, that the text elements in FIG. 9B are appropriately spaced so that blank spaces appear where the non-text elements are located in the PDF document. In some embodiments, methods or techniques may be applied to copy non-text elements from the input PDF document to the output document.

Example System

Various components of embodiments of a layout-preserved text generation method as described herein may be executed on one or more computer systems, which may interact with various other devices. One such computer system is illustrated by FIG. 10. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 10, memory 720 may include program instructions 725, configured to implement embodiments of a layout-preserved text generation method as described herein, and data storage 735, comprising various data accessible by program instructions 725. In one embodiment, program instructions 725 may include software elements of a layout-preserved text generation method illustrated in the above Figures. Data storage 735 may include data that may be used in embodiments, for example input PDF documents or output layout-preserved text documents. In other embodiments, other or different software elements and/or data may be included.

Those skilled in the art will appreciate that computer system 700 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
generating a text document from a source document, such that the generated text document preserves the source document's spatial layout of text represented within the source document, wherein said generating comprises:
   obtaining from the source document a plurality of text elements, spatial coordinates for the text elements, and font information for the text elements, wherein the source document is formatted according to a document format that specifies locations of the text elements within the source document in (X, Y) space;
   determining a base character width $W_b$ and base character height $H_b$ for positioning text characters within the generated text document, wherein the base character width $W_b$ and the base character height $H_b$ are derived from the font information for the text elements;
   for each text element of at least a subset of the plurality of text elements:
      calculating a space value S and line value L for the generated text document from a spatial coordinate (X, Y) corresponding to the location of the current text element within the source document, wherein $S=X/W_b$ and $L=Y/H_b$; and
      writing the current text element to the generated text document at (S, L); and
   storing the generated text document to a storage device.

2. The computer-implemented method as recited in claim 1, wherein said determining a base character width $W_b$ and base character height $H_b$ for positioning text characters within the generated text document, wherein the base character width $W_b$ and the base character height $H_b$ are derived from the font information for the text elements, comprises:
   if the font information for the text elements indicates that only one font type and font size is used in the source document, setting $W_b$ to an average width for characters in the font type at the font size and setting $H_b$ to an average height for the characters in the font type at the font size;
   if the font information for the text elements indicates that multiple font types or font sizes are used in the source document, determining a smallest font used in the source document, setting $W_b$ to an average width for characters in the smallest font, and setting $H_b$ to an average height for the characters in the smallest font.

3. The computer-implemented method as recited in claim 1, wherein at least a portion of the plurality of text elements are arranged in the source document in two or more columns, and wherein the method further comprises, for each text element N in the at least a portion of the plurality of text elements arranged in the two or more columns:
   calculating a space value $S_N$ and line value $L_N$ for the generated text document from a spatial coordinate ($X_N$, $Y_N$) corresponding to the location of the current text element N within the source document, wherein $S_N=X_N/W_b$ and $L_N=Y_N/H_b$,
   if the current text element N is in a first column, writing the current text element N to the generated text document at ($S_N$, $L_N$); and
   if the current text element N is in a subsequent column following a previous text element N−1 in a previous column:
      calculating a column spacing $C_{Sn}$ for the current text element N such that $C_{Sn}=S_N-(S_{N-1}+\text{NumChars}(N-1))$, where $S_{N-1}$ is the space value calculated for the previous text element N−1 and NumChars(N−1) is the number of characters in the previous text element N−1; and
      writing the current text element N to the generated text document at a horizontal location $C_{Sn}$ spaces from the end of the previous text element N−1 in the generated text document and at a vertical position $L_N$.

4. The computer-implemented method as recited in claim 1, wherein the source document is one page of a multi-page input document, and wherein the generated text document is a corresponding multi-page output document.

5. The computer-implemented method as recited in claim 1, wherein the plurality of text elements are processed in sequential order from top, left to bottom, right according to their arrangement in (X, Y) space as indicated by the spatial coordinates corresponding to the text elements.

6. The computer-implemented method as recited in claim 1, wherein the document format of the source document is portable document format (PDF).

7. A system, comprising:
at least one processor;
a storage device; and
a memory comprising program instructions, wherein the program instructions are executable by the at least one processor to generate a text document from a source document, such that the generated text document preserves the source document's spatial layout of text represented within the source document, wherein to generate the text document, the program instructions are executable by the at least one processor to:
   obtain from the source document a plurality of text elements, spatial coordinates for the text elements, and font information for the text elements, wherein the source document is formatted according to a document format that specifies locations of the text elements within the source document in (X, Y) space;
   determine a base character width $W_b$ and base character height $H_b$ for positioning text characters within the generated text document, wherein the base character width $W_b$ and the base character height $H_b$ are derived from the font information for the text elements;
   for each text element of at least a subset of the plurality of text elements:
      calculate a space value S and line value L for the generated text document from a spatial coordinate (X, Y) corresponding to the location of the current text element within the source document, wherein $S=X/W_b$ and $L=Y/H_b$; and
      write the current text element to the generated text document at (S, L); and
   store the generated text document to the storage device.

8. The system as recited in claim 7, wherein, to determine a base character width $W_b$ and base character height $H_b$ for positioning text characters within the text document, wherein the base character width $W_b$ and the base character height $H_b$ are derived from the font information for the text elements, the program instructions are executable by the at least one processor to:
   if the font information for the text elements indicates that only one font type and font size is used in the source document, set $W_b$ to an average width for characters in the font type at the font size and set $H_b$ to an average height for the characters in the font type at the font size;

if the font information for the text elements indicates that multiple font types or font sizes are used in the source document, determine a smallest font used in the source document, set $W_b$ to an average width for characters in the smallest font, and set $H_b$ to an average height for the characters in the smallest font.

9. The system as recited in claim 7, wherein at least a portion of the plurality of text elements are arranged in the source document in two or more columns, and wherein the program instructions are executable by the at least one processor to, for each text element N in the at least a portion of the plurality of text elements arranged in the two or more columns:

calculate a space value $S_N$ and line value $L_N$ for the generated text document from a spatial coordinate $(X_N, Y_N)$ corresponding to the location of the current text element N within the source document, wherein $S_N=X_N/W_b$ and $L_N=Y_N/H_b$;

if the current text element N is in a first column, write the current text element N to the generated text document at $(S_N, L_N)$; and if the current text element N is in a subsequent column following a previous text element N−1 in a previous column:

calculate a column spacing $C_{Sn}$ for the current text element N such that $C_{Sn}=S_N-(S_{N-1}+\text{NumChars}(N-1))$, where $S_{N-1}$ is the space value calculated for the previous text element N−1 and NumChars(N−1) is the number of characters in the previous text element N−1; and write the current text element N to the generated text document at a horizontal location $C_{Sn}$ spaces from the end of the previous text element N−1 in the generated text document and at a vertical position $L_N$.

10. The system as recited in claim 7, wherein the source document is one page of a multi-page input document, and wherein the generated text document is a corresponding multi-page output document.

11. The system as recited in claim 7, wherein the plurality of text elements are processed in sequential order from top, left to bottom, right according to their arrangement in (X, Y) space as indicated by the spatial coordinates corresponding to the text elements.

12. The system as recited in claim 7, wherein the document format of the source document is portable document format (PDF).

13. A computer-readable storage medium storing program instructions, wherein the program instructions are computer-executable to implement:

generating a text document from a source document, such that the generated text document preserves the source document's spatial layout of text represented within the source document, wherein said generating comprises:

obtaining from the source document a plurality of text elements, spatial coordinates for the text elements, and font information for the text elements, wherein the source document is formatted according to a document format that specifies locations of the text elements within the source document in (X, Y) space;

determining a base character width $W_b$ and base character height $H_b$ for positioning text characters within the generated text document, wherein the base character width $W_b$ and the base character height $H_b$ are derived from the font information for the text elements;

for each text element of at least a subset of the plurality of text elements:

calculating a space value S and line value L for the generated text document from a spatial coordinate (X, Y) corresponding to the location of the current text element within the source document, wherein $S=X/W_b$ and $L=Y/H_b$; and writing the current text element to the generated text document at (S, L); and storing the generated text document to a storage device.

14. The computer-readable storage medium as recited in claim 13, wherein, in said determining a base character width $W_b$ and base character height $H_b$ for positioning text characters within the generated text document, wherein the base character width $W_b$ and the base character height $H_b$ are derived from the font information for the text elements, the program instructions are computer-executable to implement:

if the font information for the text elements indicates that only one font type and font size is used in the source document, setting $W_b$ to an average width for characters in the font type at the font size and setting $H_b$ to an average height for the characters in the font type at the font size;

if the font information for the text elements indicates that multiple font types or font sizes are used in the source document, determining a smallest font used in the source document, setting $W_b$ to an average width for characters in the smallest font, and setting $H_b$ to an average height for the characters in the smallest font.

15. The computer-readable storage medium as recited in claim 13, wherein at least a portion of the plurality of text elements are arranged in the source document in two or more columns, and wherein the program instructions are computer-executable to implement, for each text element N in the at least a portion of the plurality of text elements arranged in the two or more columns:

calculating a space value $S_N$ and line value $L_N$ for the generated text document from a spatial coordinate $(X_N, Y_N)$ corresponding to the location of the current text element N within the source document, wherein $S_N=X_N/W_b$ and $L_N=Y_N/H_b$, if the current text element N is in a first column, writing the current text element N to the generated text document at $(S_N, L_N)$; and if the current text element N is in a subsequent column following a previous text element N−1 in a previous column:

calculating a column spacing $C_{Sn}$ for the current text element N such that $C_{Sn}=S_N-(S_{N-1}+\text{NumChars}(N-1))$, where $S_{N-1}$ is the space value calculated for the previous text element N−1 and NumChars(N−1) is the number of characters in the previous text element N−1; and writing the current text element N to the generated text document at a horizontal location $C_{Sn}$ spaces from the end of the previous text element N−1 in the generated text document and at a vertical position $L_N$.

16. The computer-readable storage medium as recited in claim 13, wherein the source document is one page of a multi-page input document, and wherein the generated text document is a corresponding multi-page output document.

17. The computer-readable storage medium as recited in claim 13, wherein the plurality of text elements are processed in sequential order from top, left to bottom, right according to their arrangement in (X, Y) space as indicated by the spatial coordinates corresponding to the text elements.

18. The computer-readable storage medium as recited in claim 13, wherein the document format of the source document is portable document format (PDF).

19. A computer-implemented method, comprising:
generating a text document from a source document, such that the generated text document preserves the source document's spatial layout of text represented within the source document, wherein said generating comprises:
obtaining from the source document a plurality of text elements, spatial coordinates for the text elements, and font information for the text elements, wherein the source document is formatted according to a document format that specifies locations of the text elements within the source document in (X, Y) space;
determining a base character width $W_b$ and base character height $H_b$ for positioning text characters within the generated text document, wherein the base character width $W_b$ and the base character height $H_b$ are derived from the font information for the text elements;
for each text element N of the plurality of text elements:
calculating a space value $S_N$ and line value $L_N$ for the generated text document from a spatial coordinate $(X_N, Y_N)$ corresponding to the location of the current text element N within the source document, wherein $S_N=X_N/W_b$ and $L_N=Y_N/H_b$;
if the current text element N is in a first column, writing the current text element N to the generated text document at $(S_N, L_N)$; and
if the current text element N is in a subsequent column following a previous text element N−1 in a previous column:
calculating a column spacing $C_{Sn}$ for the current text element N such that $C_{Sn}=S_N-(S_{N-1}+$NumChars(N−1)), where $S_{N-1}$ is the space value calculated for the previous text element N−1 and NumChars(N−1) is represents the number of characters in the previous text element N−1; and
writing the current text element N to the generated text document at a horizontal location $C_{Sn}$ spaces from the end of the previous text element N−1 in the generated text document and at a vertical position $L_N$;
storing the generated text document to a storage device.

20. The computer-implemented method as recited in claim 19, wherein said determining a base character width $W_b$ and base character height $H_b$ for positioning text characters within the generated text document, wherein the base character width $W_b$ and the base character height $H_b$ are derived from the font information for the text elements, comprises:
if the font information for the text elements indicates that only one font type and font size is used in the source document, setting $W_b$ to an average width for characters in the font type at the font size and setting $H_b$ to an average height for the characters in the font type at the font size;
if the font information for the text elements indicates that multiple font types or font sizes are used in the source document, determining a smallest font used in the source document, setting $W_b$ to an average width for characters in the smallest font, and setting $H_b$ to an average height for the characters in the smallest font.

21. The computer-implemented method as recited in claim 19, wherein the document format of the source document is portable document format (PDF).

22. A computer-readable storage medium storing program instructions, wherein the program instructions are computer-executable to implement:
generating a text document from a source document, such that the generated text document preserves the source document's spatial layout of text represented within the source document, wherein said generating comprises:
obtaining from the source document a plurality of text elements, spatial coordinates for the text elements, and font information for the text elements, wherein the source document is formatted according to a document format that specifies locations of the text elements within the source document in (X, Y) space;
determining a base character width $W_b$ and base character height $H_b$ for positioning text characters within the generated text document, wherein the base character width $W_b$ and the base character height $H_b$ are derived from the font information for the text elements;
for each text element N of the plurality of text elements:
calculating a space value $S_N$ and line value $L_N$ for the generated text document from a spatial coordinate $(X_N, Y_N)$ corresponding to the location of the current text element N within the source document, wherein $S_N=X_N/W_b$ and $L_N=Y_N/H_b$;
if the current text element N is in a first column, writing the current text element N to the generated text document at $(S_N, L_N)$; and
if the current text element N is in a subsequent column following a previous text element N−1 in a previous column:
calculating a column spacing $C_{Sn}$ for the current text element N such that $C_{Sn}=S_N-(S_{N-1}+$NumChars(N−1)), where $S_{N-1}$ is the space value calculated for the previous text element N−1 and NumChars(N−1) is represents the number of characters in the previous text element N−1; and
writing the current text element N to the generated text document at a horizontal location $C_{Sn}$ spaces from the end of the previous text element N−1 in the generated text document and at a vertical position $L_N$;
storing the generated text document to a storage device.

23. The computer-readable storage medium as recited in claim 22, wherein, in said determining a base character width $W_b$ and base character height $H_b$ for positioning text characters within the generated text document, wherein the base character width $W_b$ and the base character height $H_b$ are derived from the font information for the text elements, the program instructions are computer-executable to implement:
if the font information for the text elements indicates that only one font type and font size is used in the source document, setting $W_b$ to an average width for characters in the font type at the font size and setting $H_b$ to an average height for the characters in the font type at the font size;
if the font information for the text elements indicates that multiple font types or font sizes are used in the source document, determining a smallest font used in the source document, setting $W_b$ to an average width for characters in the smallest font, and setting $H_b$ to an average height for the characters in the smallest font.

24. The computer-readable storage medium as recited in claim 22, wherein the source document is one page of a multi-page input document, and wherein the generated text document is a corresponding multi-page output document.

25. The computer-readable storage medium as recited in claim 22, wherein the document format of the source document is portable document format (PDF).

* * * * *